(12) United States Patent
Lanham et al.

(10) Patent No.: US 7,628,083 B2
(45) Date of Patent: Dec. 8, 2009

(54) METHOD AND APPARATUS FOR FORCE BALANCING

(75) Inventors: Gregory Treat Lanham, Longmont, CO (US); Robert Barclay Garnett, Arvada, CO (US); Anthony William Pankratz, Arvada, CO (US); Roger Scott Loving, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 360 days.

(21) Appl. No.: 10/599,592

(22) PCT Filed: Apr. 16, 2004

(86) PCT No.: PCT/US2004/011795

§ 371 (c)(1),
(2), (4) Date: Oct. 2, 2006

(87) PCT Pub. No.: WO2005/111550

PCT Pub. Date: Nov. 24, 2005

(65) Prior Publication Data

US 2009/0100939 A1    Apr. 23, 2009

(51) Int. Cl.
*G01F 1/84* (2006.01)

(52) U.S. Cl. .................................... 73/861.355
(58) Field of Classification Search ............. None
See application file for complete search history.

(56) References Cited

U.S. PATENT DOCUMENTS

| 4,895,031 | A | 1/1990 | Cage |
| 5,230,254 | A | 7/1993 | Craft |
| 5,323,658 | A | 6/1994 | Yao et al. |
| 7,287,438 | B2 * | 10/2007 | Van Cleve ............. 73/861.355 |

FOREIGN PATENT DOCUMENTS

| EP | 0905488 A | 3/1999 |
| EP | 1248084 A1 | 10/2002 |
| EP | 1260798 A1 | 11/2002 |
| JP | 2001304935 A | 10/2001 |
| RU | 2107263 C1 | 3/1996 |

* cited by examiner

*Primary Examiner*—Harshad Patel
(74) *Attorney, Agent, or Firm*—The Ollila Law Group LLC

(57) ABSTRACT

A Coriolis flow meter comprising a pair of flow tubes (301, 302), a drive system (D) comprising a coil component (L) and a magnet component (M) that are sized and located such that the momentum of the coil component is equal and opposite to the momentum of the magnet component.

11 Claims, 9 Drawing Sheets

METHOD AND APPARATUS FOR FORCE BALANCING

BACKGROUND OF THE INVENTION

1. Field of the Invention

The present invention relates to force balancing of a Coriolis flow meter.

2. Statement of the Problem

Vibrating flow tube sensors, such as Coriolis mass flow meters, typically operate by detecting motion of a vibrating flow tube (or tubes) that contains a material. Properties associated with the material in the flow tube, such as mass flow and density may be determined by processing signals from motion transducers associated with the flow tube. The vibration modes of the vibrating material-filled system generally are affected by the combined mass, stiffness and damping characteristics of the containing flow tube and the material contained therein.

A typical Coriolis mass flow meter may include two flow tubes that are connected inline with a pipeline or other transport system and convey material, e.g., fluids, slurries and the like, in the system. Each flow tube may be viewed as having a set of natural vibration modes including, for example, simple bending, torsional, radial and coupled modes. In a typical Coriolis mass flow measurement application, two U-shaped flow tubes that are oriented parallel to each other are excited to vibrate about their end nodes in the first out-of-phase bending mode. End nodes at the ends of each tube define each tube's bending axis. A plane of symmetry exists half way between the flow tubes. In the most common mode of vibration, the flow tubes' motion is a periodic bending toward and away from each other about the plane of symmetry. Excitation is typically provided by an actuator, e.g., an electromechanical device, such as a voice coil-type driver, that pushes the flow tubes in a periodic fashion in phase opposition at the tubes' resonant frequency.

As a material flows through the vibrating flow tubes, the motion of the flow tubes is measured by motion transducers (commonly called pick-off transducers) at points spaced along the flow tube. Mass flow rate may be determined by measuring time delay or phase differences between motion at the pick-off transducer locations. The magnitude of the measured time delay is very small; often measured in nanoseconds. Therefore, it is necessary that the pick-off transducer output be very accurate.

Coriolis mass flow meter accuracy may be compromised by nonlinearities and asymmetries in the meter structure or from undesired motion arising from extraneous forces. For example, a Coriolis mass flow meter having unbalanced components can cause external vibration of its case and of the attached pipeline at the drive frequency of the meter. The coupling between the desired flow tube vibration and the undesired external vibration of the entire meter means that damping of the meter's external vibration damps the flow tube vibration, and that a stiff meter mount raises flow tube frequency while a soft meter mount lowers flow tube frequency. The change in flow tube frequency with mounting stiffness has been observed experimentally in meters with high external vibration amplitude. It is a problem because flow tube frequency is used to determine fluid density. Frequency is also an indication of flow tube stiffness. Changes in flow tube stiffness due to mounting stiffness change the calibration factor of the meter. The direct coupling between the drive vibration and (via external vibration) the local environment also results in an unstable zero signal (a flow signal when no flow is present).

The undesired external vibration perturbs the meter output signal in an amount that depends on the rigidity and damping of the mount. Since the characteristics of the mount are generally unknown and can change over time and temperature, the effects of the unbalanced components cannot be compensated and may significantly affect meter performance. The effects of these unbalanced vibrations and mounting variations are reduced by using flow meter designs that are balanced.

The balanced vibration mentioned above traditionally involves only a single direction of vibration: the Z-direction. The Z-direction is the direction that the flow tubes are displaced as they vibrate in phase opposition. This is often called the drive direction. Other directions may include the X-direction along the pipeline and the Y-direction perpendicular to the Z and X-directions. This reference coordinate system is important and will be repeatedly referred to.

There are also secondary sources of unwanted vibration in the Y-direction resulting from tube geometry. The tube geometry is normally configured so that the motion of the tubes' centers of mass is toward. and away from each other about the plane of symmetry. Thus the momentum of the oscillation of the tube (and fluid) masses largely cancels. In order to avoid Y-motion of the tube centers of mass, each center of mass must lie on its respective plane that includes its bending axis and is parallel to the symmetry plane. These planes will be referred to as the balance planes. If the symmetry plane is vertical, the centers of mass must lie directly above the bending axes to insure that this Y-direction vibration cancels.

There is also a secondary vibrating force in the Y-direction resulting from the driver, pickoff transducers, and other masses attached to the vibrating portion of the flow tubes. The sum of these additional vibrating components will be referred to, for simplicity, as the vibrating components. If the center of mass of the vibrating components attached to each flow tube is offset from that tube's balance plane, a Y-direction vibrating force is generated. This is because the tubes' bending motion has a rotation component. If the driver mass is offset from balance plane in the Z-direction, then the rotational component of tube motion causes the driver mass to have a component of motion in the Y-direction. The source of the Y-direction motion can be understood by visualizing an extreme offset of a mass. If a mass is offset from the balance plane by a 45 degree angle (taken from the bending axis), then the rotational component of motion causes it to move equally in the Y and Z-directions as it vibrates. Equal offset masses on the two vibrating tubes balance the forces in the Z-direction but not in the Y-direction.

EP 1 248 084 A1 discloses a solution to the problems of Y-vibrations by affixing an offset mass to the opposite side of a flow tube as the driver mass so as to bring the combined center of mass onto the flow tube's balance plane plane.

Secondary unbalanced vibration forces can also be generated in the Z-direction even when the masses are equal and located on the balance planes of the flow tubes. These forces, which are the subject of this invention, are generated when the masses affixed to the flow tubes have unequal moments of inertia about the lines connecting each respective tube's end nodes (hereafter referred to as bending axes).

SUMMARY OF THE SOLUTION

The present invention improves the balance of the Coriolis flow meter structure by designing the vibrating components so that the moment of inertia of each component is equal to the moment of inertia of the other drive component. The expression for the moment of inertia of an object is:

$$I = \int_r r \cdot \partial m = MR^2 \qquad (4)$$

Where:
I=the moment of inertia
m=mass
r=the distance from the rotation axis of the component to the increment of mass ∂m.
M=the total mass of the component
R=The radius of gyration of the component The moment of inertia is greatly affected by the distance term r) being a squared term. For a driver in a Coriolis flow meter, the rotation axis is unknown because the tubes bend rather than rotate. Fortunately, as long as the meter geometry is symmetric, (equal masses at equal positions) the choice of rotation axis does not matter. The parallel axis theorem states that the moment of inertia about an axis is equal to the moment of inertia about a parallel axis through the center of mass plus the mass times the distance between the two axes squared. If we set the moments of inertia of the two drive components about arbitrary symmetrical axes equal, then the distances from the arbitrary axes to the center of masses of the drive components are equal and, with the masses equal, the parallel axis term cancels. This means that to set the moments of inertia of the drive components equal, one only needs to have the centers of mass located symmetrically and to have the moments of inertia about the centers of mass equal to each other.

The components of the driver and the coil including their mounting elements are fabricated in a distributed manner so that the mass of the magnet and its mounting elements is equal to the mass of the coil and its mounting elements. In addition, the magnet and its elements and the coil and its elements are configured and mounted so their centers of mass of these elements when combined with their respective tube centers of mass are on the tubes' balance planes. Their moments of inertia about their center of masses are also made to be equal. Making the two (coil and magnet) elements of equal mass and locating the combined centers of mass on the balance plane contributes towards a reduction of undesired vibrations within the flow meter. Making the two components of equal moments of inertia contributes to a further reduction in undesired vibration.

Sometimes, however, it is difficult to set the components' moments of inertia about their centers of mass equal. In these instances an alternate approach can be used. Because both mass and moment of inertia impact the meter balance in the Z-direction, a small moment of inertia for one tube can be balanced by a larger mass on that same tube. This technique in essence uses the parallel axis theorem to balance moments of inertia about the (assumed position) axis of rotation.

In summary from the above, it can be seen that the driver embodying the present invention includes a magnet component and a coil component. It can be further seen that the components embodying the magnet component and the apparatus embodying the coil component are fabricated and mounted to their respective flow tubes in such a manner that the mass of the driver component equals that of the coil component; that the coil and magnet components have their combined (with the flow tube) centers of mass on their respective balance planes; and that the magnet component and the coil component have equal moments of inertia about their centers of mass. The mounting of such a drive coil component to the bottom of a first flow tube and the mounting of the magnet component to the bottom of a second flow tube provides a dynamically balanced structure which vibrates the flow tubes in-phase opposition and inhibits the generation of undesired internal vibrations.

Further in accordance with the present invention, the pick-off transducers are designed, fabricated, and mounted on the flow tubes in the same manner as described for the driver. In other words, each pick-off transducer has a magnet component affixed to a first flow tube, a coil component affixed to a second flow tube and distributed components that provide dynamically balanced elements that do not significantly contribute to the generation of undesired vibrational forces within the flow meter.

ASPECTS

One aspect of the invention includes a Coriolis flow meter comprising:

a first flow tube and a second flow tube adapted to be vibrated in phase opposition about a plane of symmetry;

a drive system adapted to vibrate each flow tube about axes connecting end nodes of each flow tube;

first vibrating components including a first vibrating drive system component affixed to said first flow tube;

second vibrating components including second vibrating drive system component affixed to said second flow tube;

said first and second vibrating drive system components are of equivalent size and position such that the moments of inertia of said first flow tube plus said first vibrating drive system component are substantially equal to the moments of inertia of said second flow tube plus said second vibrating drive system component.

Preferably, said first and second vibrating drive system components are sized to have substantially equal masses.

Preferably, the end nodes of said first flow tube and the combined center of mass of said first flow tube plus said first vibrating drive system component lie on a first balance plane parallel to said plane of symmetry; and end nodes of said second flow tube and the combined center of mass of said second flow tube plus said second vibrating drive system component lie on a second balance plane parallel to said plane of symmetry.

Preferably, said first vibrating drive system component includes a coil component of a driver affixed to said first flow tube; and said second vibrating drive system component includes a magnet component of said driver affixed to said second flow tube and coaxially aligned with said coil component.

Preferably, said first vibrating components further include a first pickoff component, and said second vibrating components include a second pickoff component.

Preferably, said first pickoff component is affixed to said first flow tube; and said second pickoff component is affixed to said second flow tube.

Preferably, said first and second vibrating drive system components are sized to have substantially equal masses.

Preferably, the end nodes of said first flow tube and the combined center of mass of said first flow tube plus said first vibrating drive system component lie on a first balance plane parallel to said plane of symmetry; and end nodes of said second flow tube and the combined center of mass of said second flow tube plus said second vibrating drive system component lie on a second balance plane parallel to said plane of symmetry.

Another aspect of the invention comprises a method of operating a Coriolis flow meter comprising:

a first flow tube and a second flow tube adapted to be vibrated in phase opposition about a plane of symmetry;

a drive system adapted to vibrate each flow tube about axes connecting end nodes of each flow tube; said method comprising the steps of:

affixing first vibrating components including a first vibrating drive system component to said first flow tube;

affixing second vibrating components including a second vibrating drive system component to said second flow tube;

sizing and positioning said first and second vibrating drive system components to be of equivalent size and position such that the moments of inertia of said first flow tube plus said first vibrating drive system component are substantially equal to the moment of inertia of said second flow tube plus said second vibrating drive system component.

Preferably, the method further comprises the further steps of sizing said first and second vibrating drive system components to have substantially equal masses.

Preferably, the method further comprises the further steps of:

positioning end nodes of said first flow tube and the combined center of mass of said first flow tube plus said first vibrating drive system component on a first balance plane parallel to said plane of symmetry; and positioning end nodes of said second flow tube and the combined center of mass of said second flow tube plus said second vibrating drive system component on a second balance plane parallel to said plane of symmetry.

Preferably, the method further comprises the further steps of:

affixing said first vibrating drive system components including a coil component of a driver to said first flow tube; and affixing said second vibrating drive system components including a magnet component of said driver to said second flow tube and coaxially aligned with said coil component.

Preferably, the method further comprises said first vibrating drive system component furthers include a first pickoff component and that said second vibrating drive system component further includes a second pickoff component; said method includes the further steps of:

affixing a first pickoff component to said first flow tube; and affixing a second pickoff component to said second flow tube.

Preferably, the method further comprises sizing said first and second pickoff components to have substantially equal masses.

Preferably, the method further comprises positioning end nodes of said first flow tube end nodes and the combined center of mass of said first flow tube plus said first vibrating drive system component on a first balance plane parallel to said plane of symmetry; and positioning end nodes of said second flow tube and the combined center of mass of said second flow tube plus said second vibrating drive system component on a second balance plane parallel to said plane of symmetry.

DESCRIPTION OF THE DRAWINGS

The above and other advantages and aspects of the invention may be better understood from a reading of the following detailed description taken in conjunction with the drawings in which.

DETAILED DESCRIPTION OF THE INVENTION

FIGS. 1-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
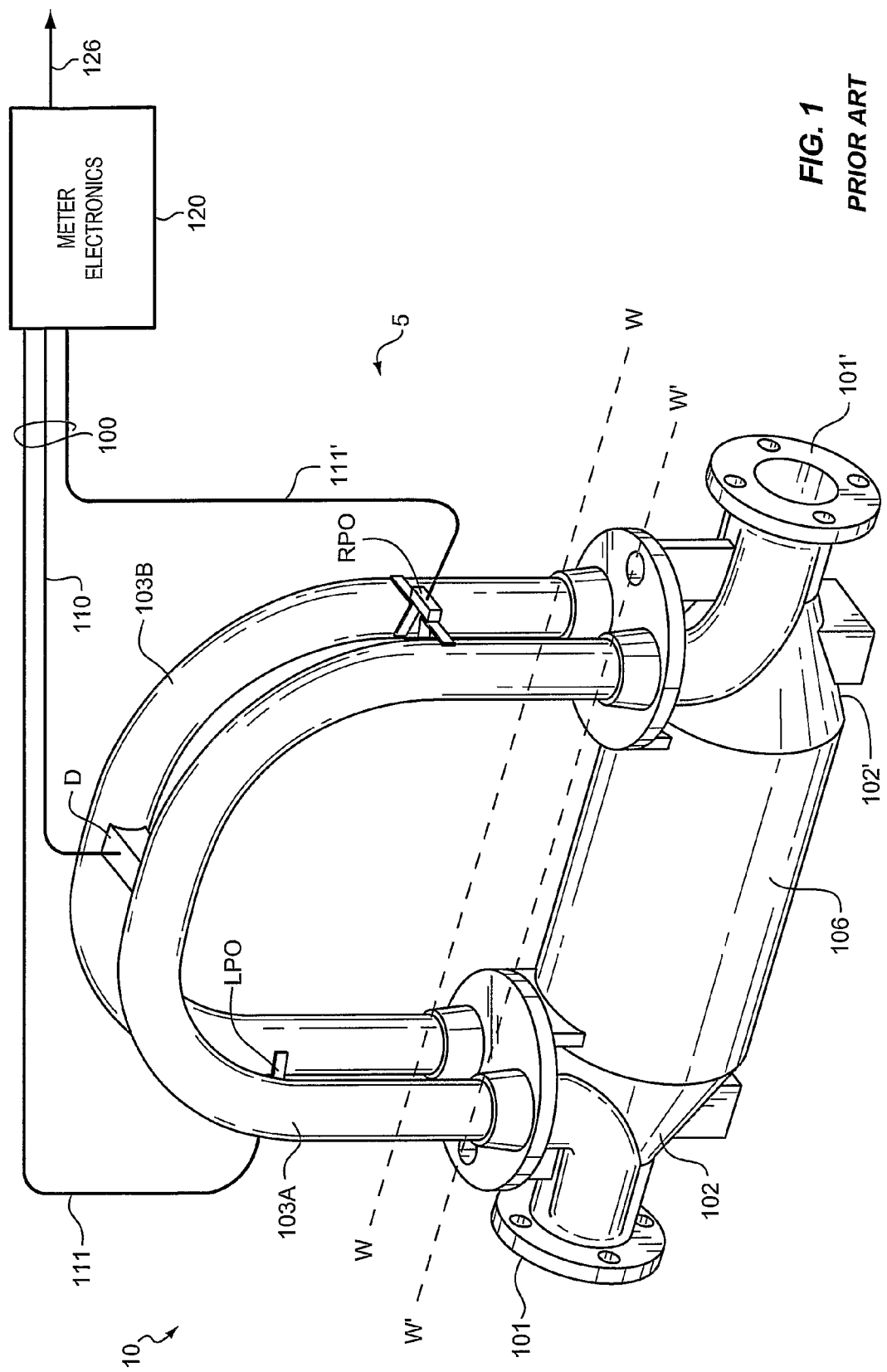
FIG. 1 illustrates a conventional prior art Coriolis flow meter.

Description of FIG. 1

FIG. 1 illustrates a Coriolis flow meter 5 comprising a flow meter assembly 10 and meter electronics 120. Meter electronics 120 is connected to meter assembly 10 via leads 100 to provide density, mass flow rate, volume flow rate, totalized mass flow, temperature, and other information over path 126. It should be apparent to those skilled in the art that the present invention can be used by any type of Coriolis flow meter regardless of the number of drivers, pick-off sensors, flow tubes or the operating mode of vibration.

Flow meter assembly 10 includes a pair of flanges 101 and 101'; manifolds 102 and 102'; driver D; pick-off sensors LPO, RPO; and flow tubes 103A and 103B. Driver D and pick-off sensors LPO and RPO are connected to flow tubes 103A and 103B.

Flanges 101 and 101' are affixed to manifolds 102 and 102'. Manifolds 102 and 102' are affixed to opposite ends of spacer 106. Spacer 106 maintains the spacing between manifolds 102 and 102' to prevent undesired vibrations in flow tubes 103A and 103B. When flow meter assembly 10 is inserted into a pipeline system (not shown) which carries the material being measured, material enters flow meter assembly 10 through flange 101, passes through inlet manifold 102 where the total amount of material is directed to enter flow tubes 103A and 103B, flows through flow tubes 103A and 103B and back into outlet manifold 102' where it exits meter assembly 10 through flange 101'.

Flow tubes 103A and 103B are selected and appropriately mounted to inlet manifold 102 and outlet manifold 102' so as to have substantially the same mass distribution, moments of inertia, and elastic moduli about bending axes W-W and W'-W' respectively. These axes contain the tube end nodes (stationary points) for each flow tube. The flow tubes extend outwardly from the manifolds in an essentially parallel fashion.

Flow tubes 103A-B are driven by driver D in phase opposition about their respective bending axes W and W' and at what is termed the first out of bending mode of the flow meter. Driver D may comprise one of many well known arrangements, such as a magnet mounted to flow tube 103A and an opposing coil mounted to flow tube 103B. An alternating current is passed through the opposing coil to cause both flow tubes to oscillate in phase opposition. A suitable drive signal is applied by meter electronics 120, via lead 110 to driver D. The description of FIG. 1 is provided merely as an example of the operation of a Coriolis flow meter and is not intended to limit the teaching of the present invention.

Meter electronics 120 transmits sensor signals on leads 111 and 111', respectively. Meter electronics 120 produces a drive signal on leads 110 which causes driver D to oscillate flow tubes 103A and 103B in phase opposition. Meter electronics 120 processes left and right velocity signals from pick off transducers LPO, RPO to compute mass flow rate. Path 126 provides an input and an output means that allows meter electronics 120 to interface with an operator.

Figure 2:
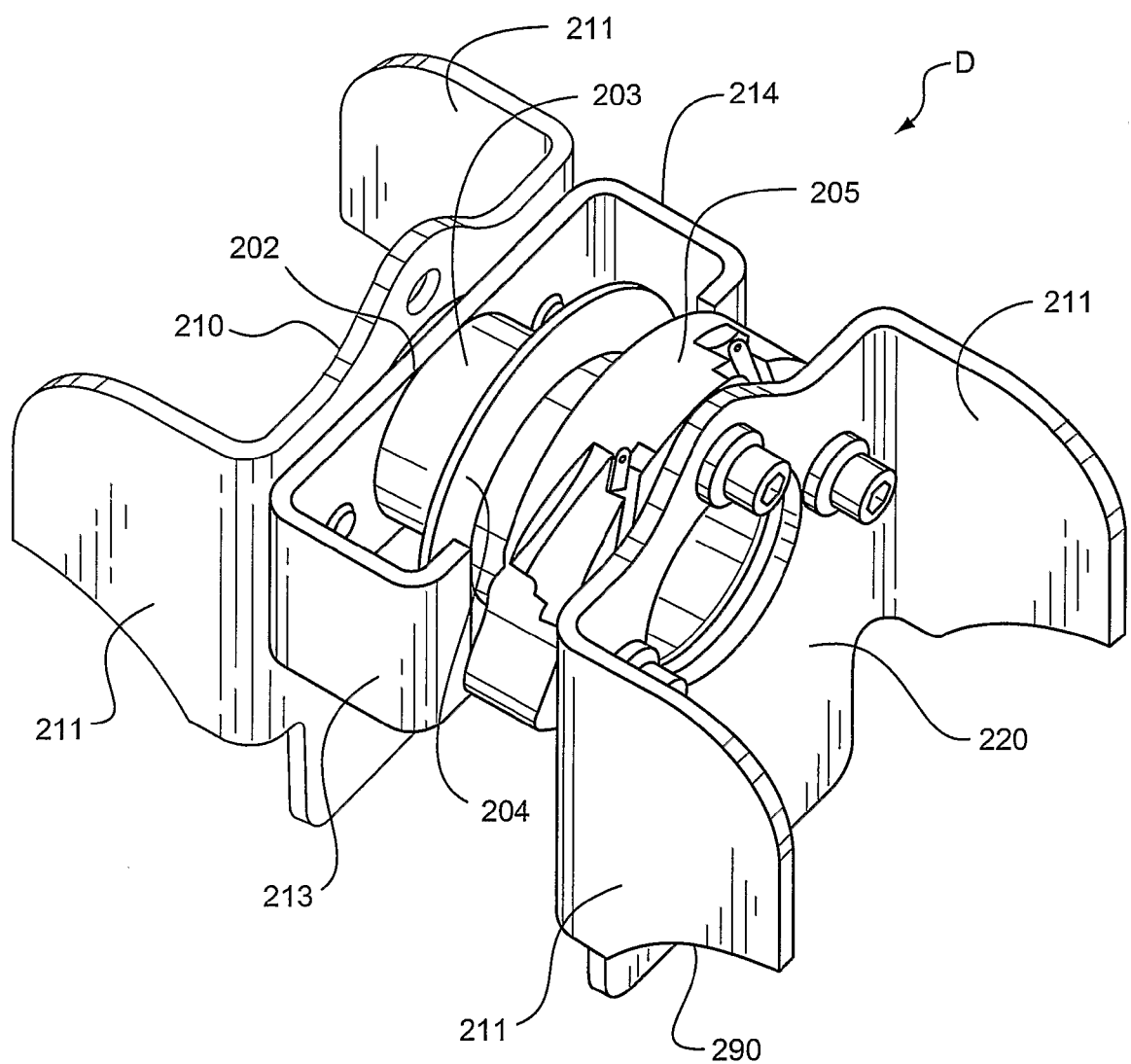
FIG. 2 illustrates a typical driver for a prior art Coriolis flow meter.

Description of FIG. 2

FIG. 2 illustrates a drive system D for a preferred embodiment of Coriolis flow meter 5. In a preferred exemplary embodiment, driver D is a coil and magnet assembly. One skilled in the art will note tat other types of drive systems, such as piezoelectric, may be used.

Driver D has a magnet assembly 210 and a coil assembly 220. Brackets 211 extend outward in opposing directions from magnet assembly 210 and coil assembly 220. Brackets 211 are wings which extend outward from the flat base and have a substantially curved edge 290 on a bottom side that is formed to receive a flow tube 103A or 103B. The curved edge 290 of brackets 211 are then welded or in some other manner affixed to flow tubes 103A and 103B to attach driver D to Coriolis flow meter 5.

Magnet assembly 210 has a magnet keeper 202 as a base. Brackets 211 extend from a first side of magnet keeper 202. Walls 213 and 214 extend outward from outer edges of a second side of magnet keeper 202. Walls 213 and 214 control the direction of the magnetic field of magnet 203 perpendicular to the windings of coil 204.

Magnet 203 is a substantially cylindrical magnet having a first and a second end. Magnet 203 is fitted into a magnet sleeve (not shown). The magnet sleeve and magnet 203 are affixed to a second surface of magnet keeper 202 to secure magnet 203 in magnet assembly 210. Magnet 203 typically has a pole (not shown) affixed to its second side. The magnet pole (not shown) is a cap that is fitted to the second end of magnet 203 to direct the magnetic fields into coil 204.

Coil assembly 220 includes coil 204, and coil bobbin 205. Coil bobbin 205 is affixed to a bracket 211. Coil bobbin 205 has a spool protruding from a first surface around which coil 204 is wound. Coil 204 is mounted on coil bobbin 205 opposing magnet 203. Coil 204 is connected to lead 110 which applies alternating currents to coil 204. The alternating currents cause coil 204 and magnet 203 to attract and repel one another which in turn causes flow tubes 103A and 103B to oscillate in opposition to one another.

Figure 3:
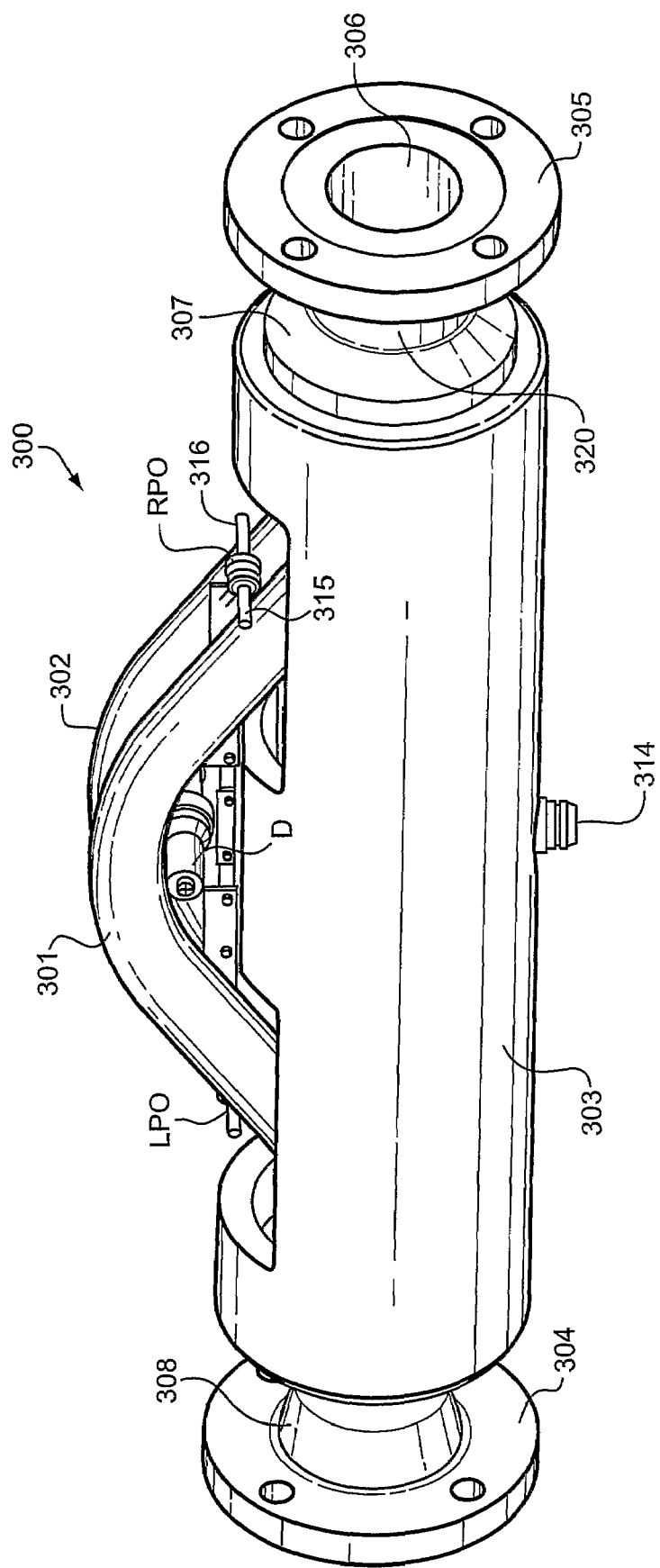
FIG. 3 illustrates a perspective view of a Coriolis flow meter embodying the present invention.

Description of FIG. 3

FIG. 3 discloses a Coriolis flow meter 300 embodying the present invention. Flow meter 300 comprises a spacer 303 enclosing the lower portion of the flow tubes 301, 302 which are internally connected on Their left ends to flange 304 via its neck 308 and which are connected on their right ends via neck 320 to flange 305, and manifold 307. Also shown on FIG. 3 are the outlet 306 of flange 305, left pick off LPO, right pick-off RPO and driver D. The right pick-off RPO is shown in some detail and includes a magnet structure 315 and a coil structure 316. Element 314 on the bottom of manifold spacer 303 is art opening for receiving from meter electronics 120 the wires 100 that extend internally to driver D and pick-offs LPO and RPO. Flow meter 300 is adapted when in use to be connected via flanges 304 and 305 to a pipeline or the like.

Figure 4:
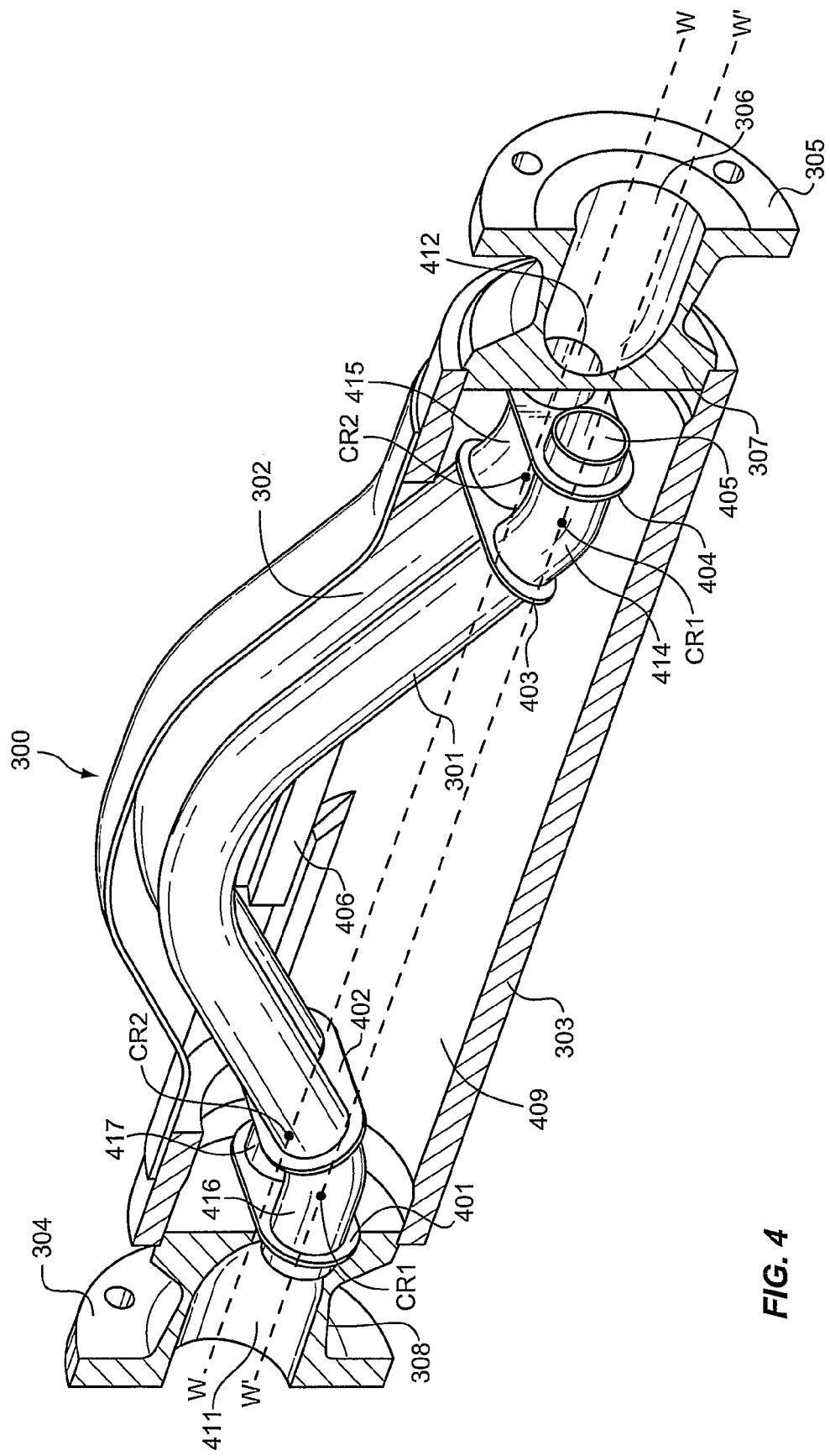
FIG. 4 illustrates the Coriolis flow meter of FIG. 4 with a portion of the outer shell removed.

Description of FIG. 4

FIG. 4 is a cut away view of flow meter 300. This view removes the front portion of manifold spacer 303 so that parts internal to the manifold spacer may be shown. The parts that are shown on FIG. 4, but not on FIG. 3, include outer end brace bars 401 and 404, inner brace bars 402 and 403, right end flow tube outlet openings 405 and 412, flow tubes 301 and 302, curved flow tube sections 414, 415, 416, and 417. In use, flow tubes 301 and 302 vibrate about their bending axes W and W'. The outer end brace bars 401 and 404 and the inner brace bars 402 and 403 help determine the location of bending axes W and W'. Element 406 is a mounting fixture for the wires affixed to driver D and pick-offs LPO and RPO which are not shown on FIG. 4 to minimize complexity. Surface 411 is the flow meter inlet; surface 306 is the flow meter outlet.

Element 405 and 412 are the inner surface of the right ends of flow tubes 301 and 302. The bending axes W and W' are shown extending the length of the flow meter 300.

Figure 5:
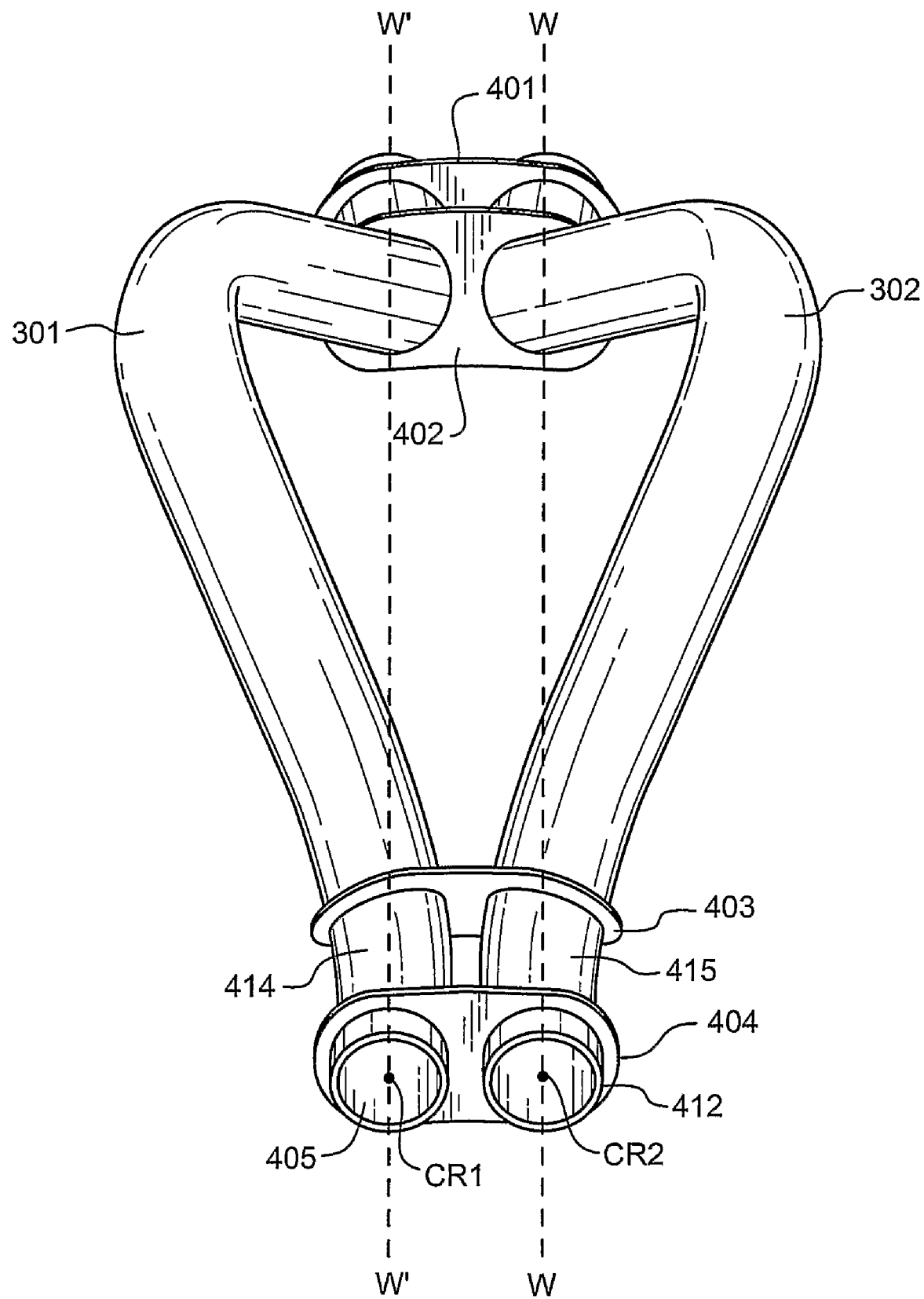
FIG. 5 illustrates the flow tubes and brace bars of the Coriolis flow meter of FIG. 3.

Description of FIG. 5

FIG. 5 comprises an end view of flow tubes 301 and 302 which are shown as being outwardly deflected from each other under the influence of driver D (which is not shown on FIG. 5). Inner brace bars 402 and 403 as well as outer brace bars 401 and 404 together with outlet openings 405 and 412 are also shown on FIG. 5. The portrayal of the outward deflection of flow tubes 301,302 is shown exaggerated to facilitate an understanding of its operation. In use, the deflections of the flow tubes by the driver D are so small in magnitude so as to be undetectable by the human eye. Bending axes W and W' for flow tubes 301 and 302 are also shown.

Figure 6:
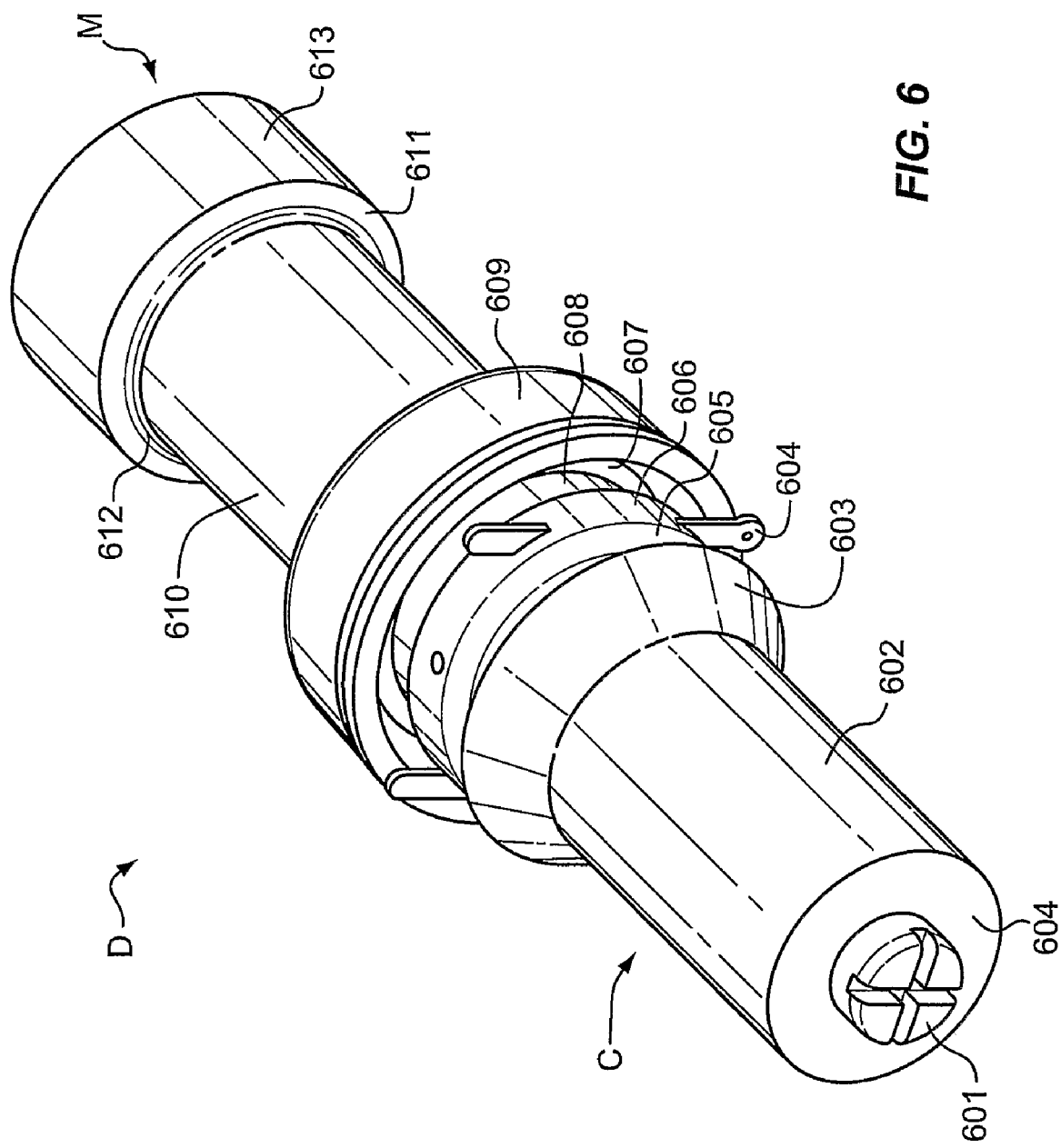
FIG. 6 illustrates the perspective view of the driver D of the Coriolis flow meter of FIG. 3.

Description of FIG. 6

FIG. 6 discloses driver D which has a coil section C and a magnet section M. Coil section C is shown as having end 601 of a bolt (not shown) which extends axially through the entirety of the coil section C. Surface 604 is the axial outer end of coil section C. Element 602 is a coil spacer that surrounds coil section C. Surface 603 is a spacer. Element 604 supports the wires (not shown) which are connected to the ends of coil winding of coil section C. Element 605 is the outer surface of the coil bobbin. Element 606 is the surface around which the wires of coil section C are wound. Element 608 are the wires comprising coil section C.

The right hand magnet section includes keeper 609, cylindrical magnet bracket 610 which surrounds an inner magnet, transition surface 612, counter weight and magnetic brackets 613, and surface 611 on the left end of magnetic bracket 613.

In use, coil 608 is energized by a sinusoidal signal from meter electronics 120 over conductors 110. The field created by energized coil 608 interacts with the magnetic field at the end of the magnet to cause the coil element C and the magnet element M to move axially in-phase opposition under The influence of the energizing signal from meter electronics 120. In so doing, the right end portion of coil element C on FIG. 6 including the coil 608 and surface 607 move in and out axially of the magnetic keeper 609. As shown on FIG. 8, the upper surface of coil spacer 602 is affixed to a lower surface of flow tube 301. In a similar manner the upper surface of magnet bracket 610 is affixed to the lower surface of flow tube 302.

The oscillatory movement of the coil and magnet components of driver D causes a similar oscillatory motion of flow tubes 301 and 302 to vibrate in-phase opposition under the influence of the drive signal on path 110.

Figure 7:
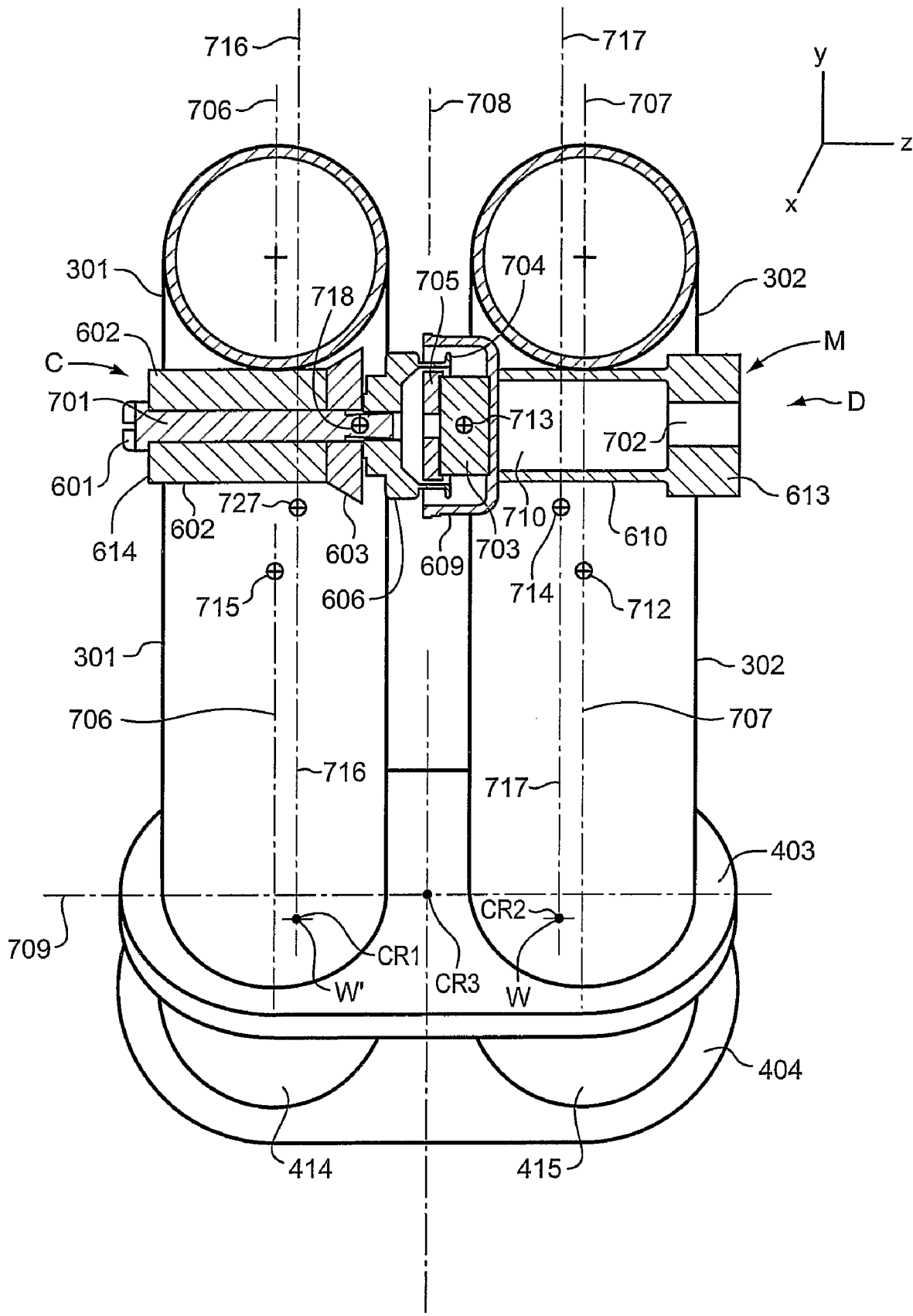
FIG. 7 illustrates a vertical cross sectional view of the flow tubes of FIG. 4 affixed to the driver elements embodying the invention.

Description of FIG. 7

FIG. 7 is a cross section view of the flow tubes 301 and 302 taken about their longitudinal axial mid-portion as well as a cross section view of the elements of coil component C, magnet component M of driver D. Coil spacer 602 has its top surface affixed to the lower surface of flow tube 301. The top surface of magnet bracket 610 is affixed to die lower surface of flow tube 302. Coil spacer 602 and magnet bracket 610 may be affixed to the flow tubes by means of brazing and/or spot welding. Bolt 701 having end 601 is contained within coil spacer 602 and extends inwardly through spacer 603 and terminates in element 606. Element 606 is affixed to element 704 which includes the surface about which the coil 608 of FIG. 6 is wound.

The magnet M component of driver D includes element 702 on its outer right end. The left end of magnet M is element 703; the middle portion of magnet M is element 710. The right hand portion 702 is contained within counter weight 613. When component coil C of driver D is energized, the right hand portion of coil component C and the left hand portion 703 of magnet component M vibrate axially inwardly and outwardly with respect to each other and in so doing cause a similar inward and outward vibration of flow tubes 301 and 302.

When driver D vibrates flow tubes 301 and 302, flow tube 301 vibrates about bending axis W' and while flow tube 302 vibrates about bending axis W. This is more clearly shown on FIGS. 4 and 5. Vertical line 716 is in the balance plane for flow tube 301. Balance plane 716 contains the bending axis W' and is parallel to the plane of symmetry 708. Vertical line 717 is in the balance plane for flow tube 302. Balance plane 717 contains bending axis W and is also parallel to the plane of symmetry 708 which is midway between planes 716 and 717.

Flow tubes 301 and 302 vibrate like a tuning fork about their respective bending axes W' and W. However, the two flow tubes by themselves are not a perfectly dynamically balanced structure and therefore may be assumed to generate a low level of undesired vibrations within the Coriolis flow meter of which they are a part.

FIG. 7 shows the bending axes W' and W located slightly inward from the centerlines 706 and 707 of flow tubes 301 and 302. These bending axes W' and W are often located on the flow tube centerlines 706 and 707. However in the present invention as shown on FIG. 7, bending axes W' and W are shown offset the flow tube center lines 706 and 707 because of the mass and stiffness of the structures to which they are attached. The flow tube centers of mass 712 and 715, (neglecting the attached components), are on the tube centerlines 706 and 707. As the tubes bend inwards, their centers of mass 715 and 712 follow circumferential paths about the bending axes W' and W. It can thus be seen that as the centers of mass approach their respective balance planes 716 and 717, they also move slightly upward. Likewise, as the centers of mass 715 and 712 of the flow tubes move away from their respective balance planes 716 and 717, they move downward. Unless balanced, this vertical movement of the tube centers of mass 715 and 712 would cause the meter to shake in the Y-direction.

The driver of a typical flow meter also has a mass that is dynamically unbalanced when affixed to the flow tubes of the typical Coriolis flow meter. Such a driver is shown in FIG. 2 and can seen as comprising a first structure 220 that is affixed to a first flow tube and a second structure 210 that is affixed to a second flow tube. Such a driver adds significant mass to the vibrating structure of the flow tubes. Also the driver adds the mass in such a manner that the bulk of the mass is positioned in the space between the two flow tubes. This mass comprises elements 204, 203, 205, 213, and 214 of the driver of FIG. 2.

If the structure of the driver of FIG. 2 were added to the flow tubes 301, 302, instead of the driver D of the present invention, the flow meter would likely remain unbalanced since the centers of mass of the driver components of FIG. 2 would be positioned between the radial centers 706 and 707 of flow tubes 301 and 302. These centers of mass would lie far to the inner side of the balance plane 716 and 717. Because of this location, the drive component centers of mass would go down as the tubes move toward each other and up as they move away from each other. This would cancel the y-direction unbalance from the bare flow tubes but, unfortunately, with prior art drivers, the effect of the drive component offsets overwhelms the effect of the flow tube center of mass offset from the balance plane. This dynamic unbalanced would in turn generates significant amount of undesired vibrations in such a flow meter.

The driver D of the present invention includes coil component C and a magnet component M which are affixed to the bottom of respective ones of flow tubes 301 and 302 in such a manner as to enable the flow tubes to operate with a minimum of undesired vibrations. This is achieved in accordance with the present invention by designing, fabricating, and configuring the coil component C and magnet component M so that they each comprises a dynamically balanced structure having equal and identical inertial characteristics. Elements are affixed individually to the bottom of flow tube 301 and 302. They are positioned in axial alignment with each other so that the axial center of the coil and the magnet have a common center axis that enables the two elements to vibrate in-phase opposition along their common axis. The affixing of the drive element C with its center of mass 718 to flow tube 301 with its center of mass 715 creates a combined center of mass 727 that lies on the balance plane 716. Likewise, the affixing of the drive element M with its center of mass 713 to flow tube 302 with its center of mass 712 creates a combined center of mass 714 that lies on the balance plane 717. Locating the combined centers of mass on balance planes 716 and 717 ensures that the added components do not disturb the vibrational balance of the meter and thus do not generate any undesired vibration in the Y-direction.

The coil C component and the magnet M component of driver D are designed, fabricated, and configured to have the vibrational characteristics next described. First, the mass of the coil C component is made equal to the mass of the magnet M component of driver D. The center of mass 718 of the coil and the center of mass 713 of the magnet are made equal distance from the bending axes W' and W. Next, the moment of inertia is configured for the coil C component and the magnet M component so that the moment of inertia of each of these is made essentially equal. The moment of inertia of each of these elements may be expressed as $$I = \int r^2 \cdot \partial m$$

Where:
I=the moment of inertia of the component
m=mass of each incremental element r=the distance from each incremental element to the center of mass of the component Lastly, the center of mass of each drive component is located such that the combined centers of mass of each drive component and its respective flow tube are located on the balance planes 716 and 717. Designing a driver to these rules ensures a dynamically balanced structure that enables the flow tubes to be vibrated in-phase opposition while avoiding the generation of undesired vibrations.

Figure 8:
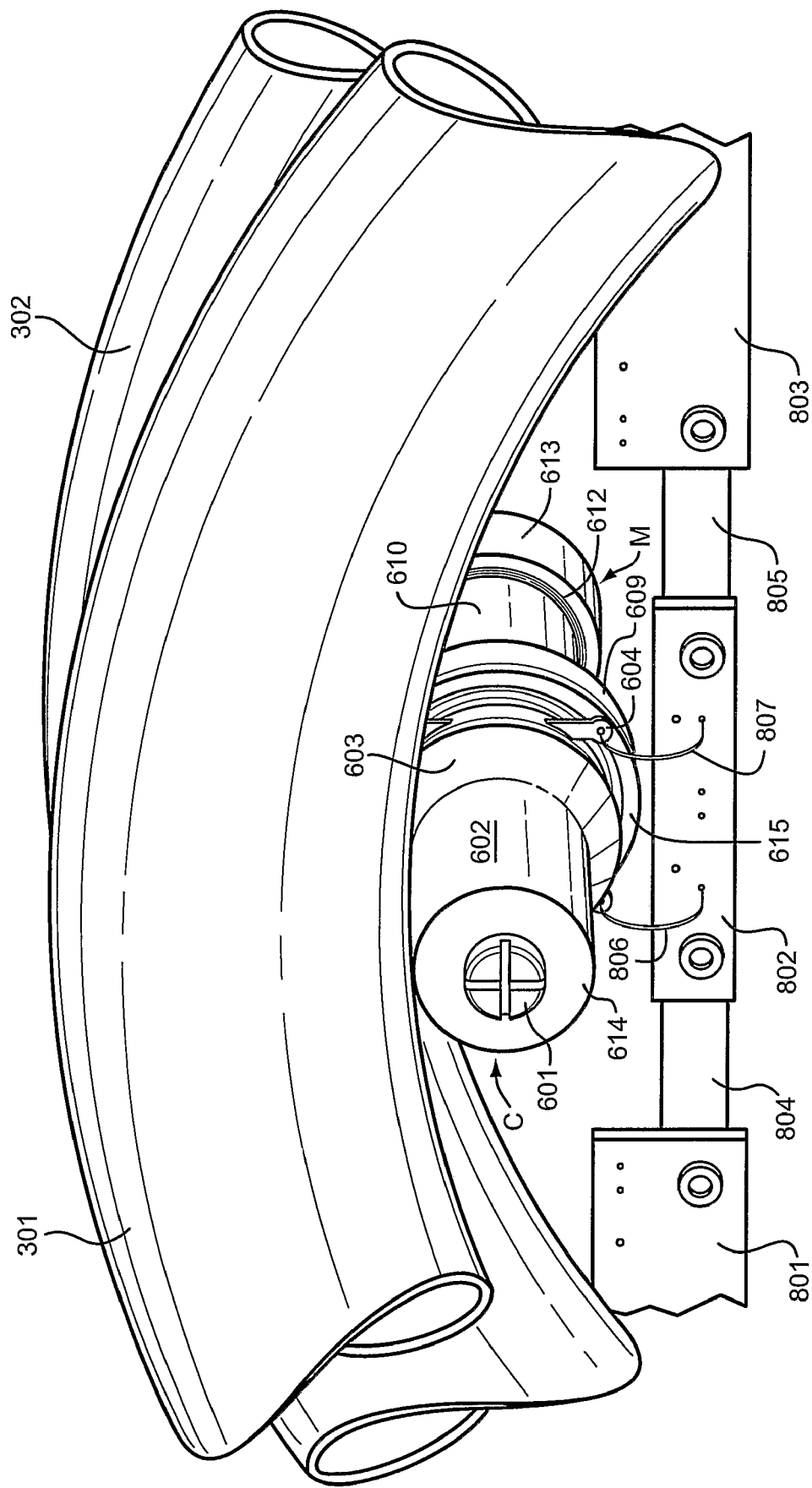
FIG. 8 illustrates the details of the driver D affixed to first and second flow tubes.

Description of FIG. 8

FIG. 8 discloses the details of the driver D of FIGS. 6 and 7 when affixed to the bottom of flow tubes 301 and 302. FIG. 8 shows the end 601 of the bolt that extends through coil C. It further shows end surface 614 of the coil section and the coil spacer cover 602, coil surface 603, wire terminal 604. FIG. 8 also shows the elements 609, 610, 612, and 613 of the magnet component M. FIG. 8 shows conductors 806 and 807 extending from bracket 802 to coil terminals 604. Conductors 806 and 807 are connected by conductors 110 (not shown) to apply energizing signal 110 from meter electronics 120 to coil section C. Brackets 801, 802, 803, 804, and 805 are mounting brackets to support conductors 806 and 807. The magnet bracket 610 is affixed to the bottom of flow tube 302 in the same manner that the coil spacer element 602 is affixed to the bottom of flow tube 301.

Figure 9:
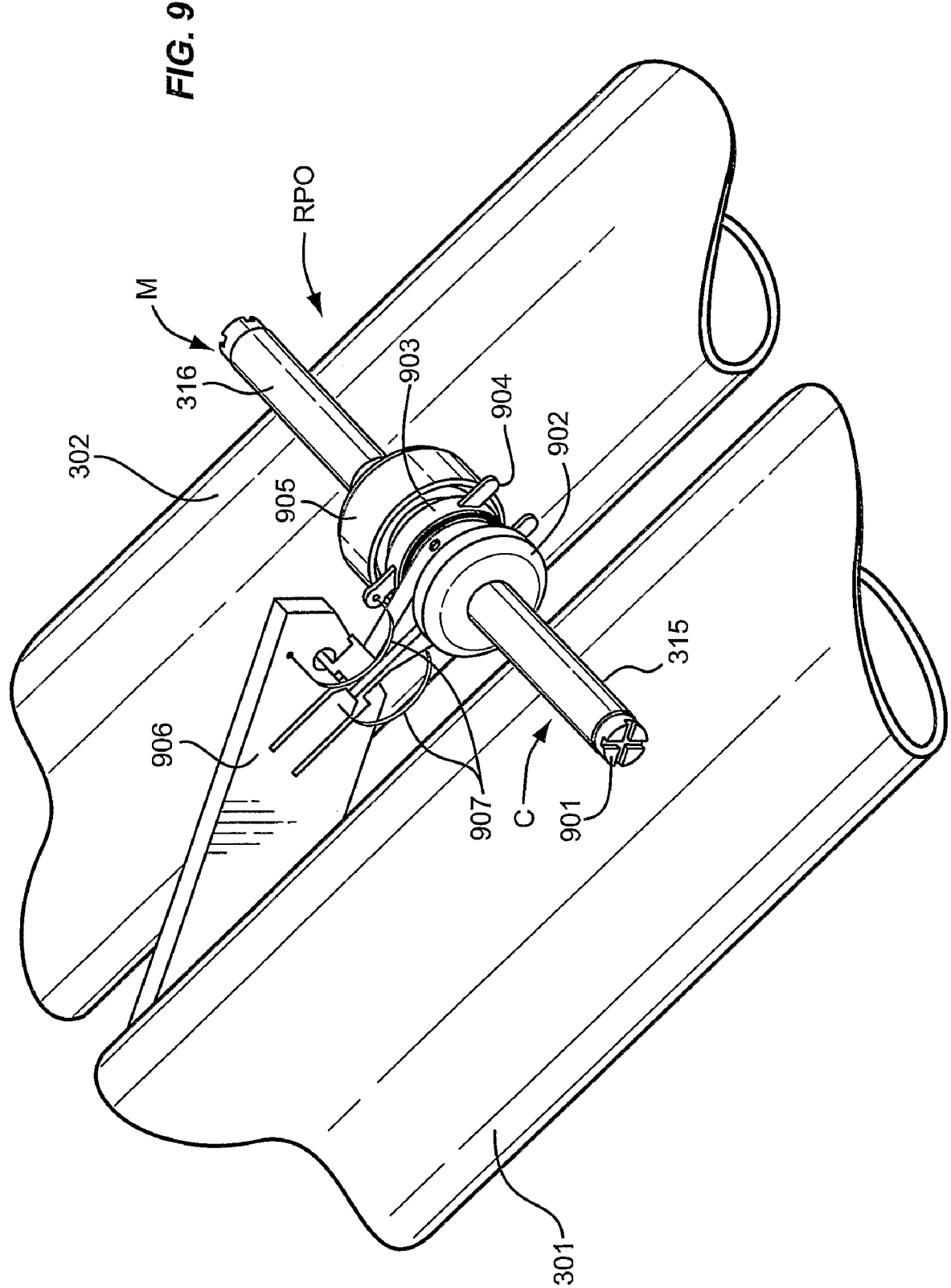
FIG. 9 illustrates the details of pick-off transducers and the manner in which they are affixed to the flow tubes.

Description of FIG. 9

FIG. 9 illustrates further details of pick-offs RPO and LPO of FIG. 3 affixed to the top of flow tubes 301 and 302. Each pick-off has a coil component C and a magnet component M in the same manner as does the driver D. The coil C component has a spacer 315 affixed to the top of flow tube 301; the magnet M component has a spacer 316 affixed to the top of flow tube 302. Pick-off RPO has conductors 907 which are connected to conductor paths 111 and 111' of FIG. 1 by means not shown in detail on FIG. 9. These conductors are supported by bracket 906. The coil C component has a element 902 and 904 to support the coil conductors as well as further having an axially inner end surface 903. Magnet M component has an inner end portion 905 that corresponds to element 609 of magnet component M of FIG. 6.

The pick-offs RPO and LPO are designed, configured, and fabricated in the same manner as described for the driver so that each component has equal masses, centers of mass on the balance planes, and equal moments of inertia. This ensures that the parts of the pick-offs comprise dynamically balanced structures that can be affixed to the flow tubes as shown so as to enable the flow tubes to be operated in a manner that does not generate undesired vibrations.

It is expressly understood that the claimed invention is not to be limited to the description of the preferred embodiment but encompasses other modifications and alterations within the scope and spirit of the inventive concept.

What is claimed is:

1. A Coriolis flow meter comprising:

a first flow tube (301) and a second flow tube (302) adapted to be vibrated in phase opposition about a plane of symmetry (708);

a drive system (D) adapted to vibrate each flow tube about bending axes connecting end nodes of each flow tube;

first vibrating components (D, LPO, RPO) including a first vibrating drive system component (C) affixed to said first flow tube;

second vibrating components including second vibrating drive system component (M) affixed to said second flow tube;

said first and second vibrating drive system components are of equivalent size and position such that the moments of inertia of said first flow tube plus said first vibrating drive system component are substantially equal to the moments of inertia of said second flow tube plus said second vibrating drive system component;

characterized in that the bending axis (W') of said first flow tube and the combined center of mass of said first flow tube plus said first vibrating drive system component (C) lie on a first balance plane parallel to said plane of symmetry; and the bending axis (W) of said second flow tube and the combined center of mass of said second flow tube plus said second vibrating drive system component (M) lie on a second balance plane parallel to said plane of symmetry.

2. The Coriolis flow meter of claim 1 characterized in that said first and second vibrating drive system components are sized to have substantially equal masses.

3. The Coriolis flow meter of claim 1 characterized in that:

said first vibrating drive system component includes a coil component (C) of a driver affixed to said first flow tube; and said second vibrating drive system component includes a magnet component (M) of said driver affixed to said second flow tube and coaxially aligned with said coil component.

4. The Coriolis flow meter of claim 1 characterized in that said first vibrating components further include a first pickoff component (602), and said second vibrating components include a second pickoff component (610).

5. The Coriolis flow meter of claim 4 characterized in that said first pickoff component (602) is affixed to said first flow tube (301); and said second pickoff component (610) is affixed to said second flow tube (302).

6. The Coriolis flow meter of claim 5 characterized in that said first and second vibrating drive system components are sized to have substantially equal masses.

7. A method of operating a Coriolis flow meter comprising the steps of:

a first flow tube and a second flow tube adapted to be vibrated in phase opposition about a plane of symmetry;

a drive system adapted to vibrate each flow tube about bending axes connecting end nodes of each flow tube; said method comprising the steps of:

affixing first vibrating components including a first vibrating drive system component to said first flow tube;

affixing second vibrating components including a second vibrating drive system component to said second flow tube;

sizing and positioning said first and second vibrating drive system components to be of equivalent size and position such that the moments of inertia of said first flow tube plus said first vibrating drive system component are substantially equal to the moment of inertia of said second flow tube plus said second vibrating drive system component;

characterized in that said method comprises the further step of:

positioning the bending axis of said first flow tube and the combined center of mass of said first flow tube plus said first vibrating drive system component on a first balance plane parallel to said plane of symmetry; and positioning the bending axis of said second flow tube and the combined center of mass of said second flow tube plus said second vibrating drive system component on a second balance plane parallel to said plane of symmetry.

8. The method of claim 7 including the further steps of sizing said first and second vibrating drive system components to have substantially equal masses.

9. The method of claim 7 including the further steps of:
affixing said first vibrating drive system components including a coil component of a driver to said first flow tube; and
affixing said second vibrating drive system components including a magnet component of said driver to said second flow tube and coaxially aligned with said coil component.

10. The method of claim 7 characterized in that said first vibrating drive system component furthers include a first pickoff component and that said second vibrating drive system component further includes a second pickoff component; said method includes the further steps of:
affixing a first pickoff component to said first flow tube; and
affixing a second pickoff component to said second flow tube.

11. The method of claim 10 including the further step of:
sizing said first and second pickoff components to have substantially equal masses.

* * * * *